United States Patent
Venkatesan et al.

(10) Patent No.: US 9,779,438 B2
(45) Date of Patent: Oct. 3, 2017

(54) METHOD AND SYSTEM FOR ENTITY CUSTOMIZATION IN A HIERARCHICAL SERVICE PROVIDER, MULTI-TENANT SYSTEM

(71) Applicants: Rajesh Venkatesan, Chennai (IN); Madhava Venkatesh Raghavan, Chennai (IN); Sezhiyan Navarasu, Chennai (IN)

(72) Inventors: Rajesh Venkatesan, Chennai (IN); Madhava Venkatesh Raghavan, Chennai (IN); Sezhiyan Navarasu, Chennai (IN)

(73) Assignee: HCL TECHNOLOGIES LIMITED (IN)

(*) Notice: Subject to any disclaimer, the term of this patent is extended or adjusted under 35 U.S.C. 154(b) by 617 days.

(21) Appl. No.: 13/684,595

(22) Filed: Nov. 26, 2012

(65) Prior Publication Data

US 2014/0149246 A1    May 29, 2014

(51) Int. Cl.
| | |
|---|---|
| *G06Q 30/00* | (2012.01) |
| *G06F 17/30* | (2006.01) |
| *G06Q 30/06* | (2012.01) |
| *G06Q 10/10* | (2012.01) |

(52) U.S. Cl.
CPC ....... *G06Q 30/0621* (2013.01); *G06Q 10/103* (2013.01)

(58) Field of Classification Search
CPC ................................................. G06Q 30/0621
See application file for complete search history.

(56) References Cited

U.S. PATENT DOCUMENTS

| | | | |
|---|---|---|---|
| 8,509,226 B1* | 8/2013 | Murphy et al. | 370/352 |
| 9,361,366 B1* | 6/2016 | Yancey | G06F 17/30699 |
| 2006/0235715 A1* | 10/2006 | Abrams et al. | 705/1 |
| 2006/0235831 A1* | 10/2006 | Adinolfi | G06Q 40/00 |
| 2009/0282045 A1* | 11/2009 | Hsieh et al. | 707/9 |
| 2010/0205227 A1* | 8/2010 | Weissman et al. | 707/803 |

OTHER PUBLICATIONS

Wallace, A. J., Burns, D. A., Chin, D. M., Keyes, D. S., Norris, J. P., & Jr, P. D. (1101).Method for resolving permission for role activation operators Retrieved from https://search.proquest.com/docview/869821300?accountid=14753.*

* cited by examiner

*Primary Examiner* — Kathleen Palavecino
(74) *Attorney, Agent, or Firm* — Hayes Soloway P.C.

(57) ABSTRACT

A method and system for entity customization in a hierarchical service provider, multi-tenant system is disclosed. The method disclosed uniquely identifies plurality of participants in the hierarchical system as a root service provider, sub-provider or a tenant. Further, the method enables identification of entities as customizable or non-customizable and authorizes the participants to customize the respective entity. The method enables to define scope of the entity that indicates whether the entity is applicable to a tenant or a provider or a sub-provider or a combination of these. The method enables identification of non-customizable or mandatory attributes within an entity. Further, the method aggregates customizations through the hierarchy and applies them for a specific tenant or a provider.

9 Claims, 4 Drawing Sheets

METHOD AND SYSTEM FOR ENTITY CUSTOMIZATION IN A HIERARCHICAL SERVICE PROVIDER, MULTI-TENANT SYSTEM

TECHNICAL FIELD

The embodiments herein relate to entity customization and more particularly relates to entity customization in a hierarchical service provider, multi-tenant system.

BACKGROUND

Availability of high speed internet access has offered software application service providers a better option of using multi-tenant architecture. Multi-tenancy is an architecture in which a single instance of a software application runs on server hardware, serving multiple customers. Each customer is called a tenant. In the multi-tenancy environment, multiple customers share the same application, running on the same operating system, on the same hardware, with the same data-storage mechanism. The distinction between the customers is achieved during application design, providing privacy as well as security. The tenants may be given the ability to customize some parts of the application called entities.

A service provider organizations (using multi-tenant system) that delivers services through its sub-providers (resellers) follow the hierarchical model. The hierarchical model includes plurality of participants (customers) at multiple levels of hierarchy. In such scenarios, there is no standard way of delivering the same instance of the software to its own tenants as well as to the tenants acquired by sub-providers and allowing customization of entities at the sub-provider level.

Conventionally, this is accomplished by having separate instance of the software for individual needs and customizing the entities independently. Some existing methods provide entity customization but fail to address issues related with entity level customization in hierarchical service provider multi-tenant system. The existing methods fail to identify the hierarchy in the multi-tenant system. Also, the existing methods fail to distinguish the entities based on whether customizable or non customizable entities.

Some existing methods discuss entity level customization in a hierarchical system without providing process of entity customization. These methods identify the hierarchical level of the participant in the hierarchical system but fail to indicate the scope of the entities (applicability of the entity to the participant at specific level in the hierarchical system).

In light of above discussion, a method and system that uniquely identifies the participants in the hierarchical service provider multi-tenant system to provide entity level customization by defining scope of the entities is appreciated.

BRIEF DESCRIPTION OF THE FIGURES

The embodiments herein will be better understood from the following detailed description with reference to the drawings, in which.

DETAILED DESCRIPTION OF EMBODIMENTS

Figure 1:
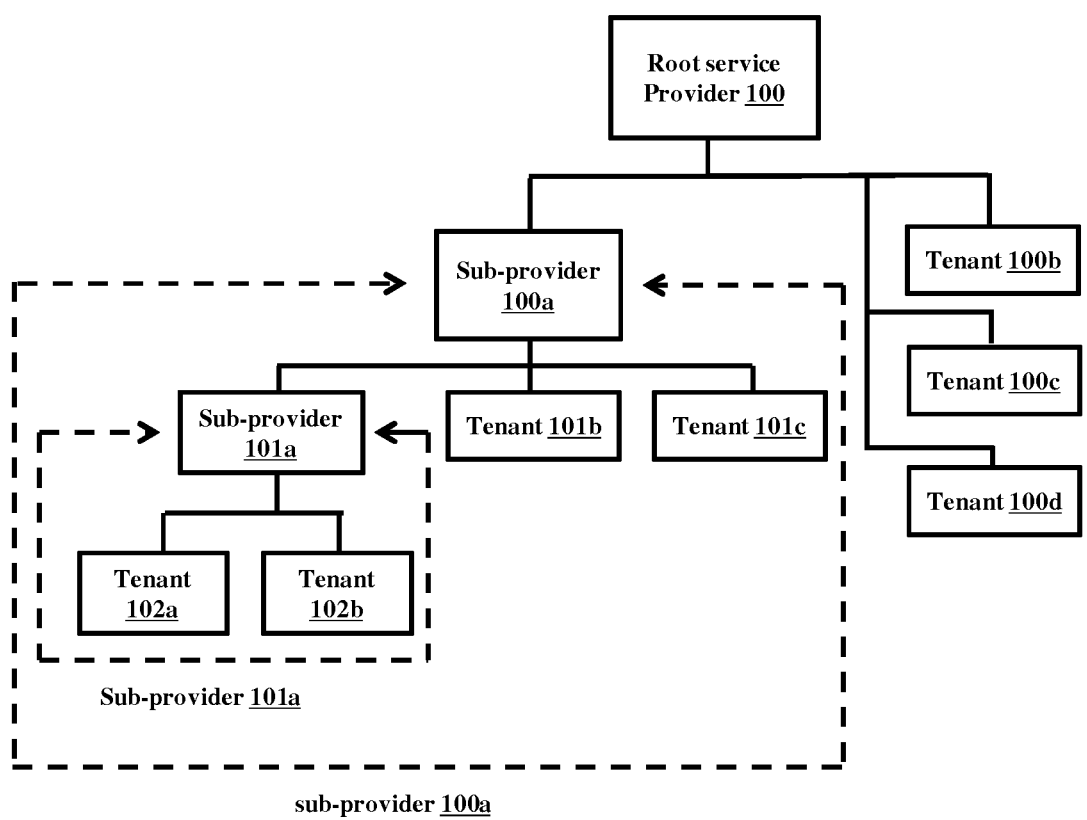
FIG. 1 illustrates an exemplary hierarchical service provider model, according to the embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and a system for entity customization in a hierarchical service provider, multi-tenant system. The method provides an application platform for an application service provider (root service provider) to enable entity level customization at plurality of hierarchy levels. The application platform standardizes the platform delivery to its subsidiaries (tenants) as well as to the sub-providers (resellers) participating in the hierarchical service provider, multi-tenant system. The method uniquely identifies plurality of participants in the hierarchical system as a root service provider or sub-provider or tenant. The method defines hierarchy in the multi-tenant system by establishing root provider-tenant, root service provider-sub-provider hierarchy. Further, the method enables identification of entities as customizable or non-customizable and authorizes participants (root service provider, sub-provider and/or tenant) to customize the respective entity. The method enables to define scope of the entity that indicates whether the entity is applicable to a tenant or a provider or a sub-provider or a combination of these. The method enables identification of non-customizable/mandatory attributes within an entity. Further, the method aggregates customizations through the hierarchy and applies them for a specific tenant or a provider (the root provider or the sub-provider).

The entity in the multi-tenant system represents and manages database model. The entity is a domain model of an application provided by the root service provider. For example, in a health care application patient, hospital, diagnosis and so on can be various domain models (entities). Each entity can have plurality of attributes. The attribute defines the entity and stores part of information concerned to the entity. For example, the entity 'patient' can have name, Social Security Number (SSN), address, zip code and country and so on as its attributes.

Throughout the description provider includes root service provider and/or sub-provider and each provider is parent provider of its sub-provider and/or tenant present in the immediate next lower level in the hierarchy.

Throughout the description participants include users and/or customers.

Referring now to the drawings, and more particularly to FIGS. 1 through 4, where similar reference characters denote corresponding features consistently throughout the figures, there are shown embodiments.

FIG. 1 illustrates an exemplary hierarchical service provider model, according to the embodiments disclosed herein. The figure depicts a root service provider 100 at the top of the hierarchical model who provides service to a sub-provider 100a, a tenant 100b, a tenant 100c, and a tenant 100d at the second highest level in the hierarchy. The sub-provider 100a is a reseller and further provides service to a sub-provider 101a, a tenant 101b and a tenant 101c at the third level in the hierarchy. Further, the sub-provider 101a is a reseller and provides service to a tenant 102a and tenant 102b at the fourth level of hierarchical model depicted in the figure. The root service provider 100 is an organization that owns an application and delivers it in a multi-tenant model to the sub-provider 100a, the tenant 100b, the tenant 100c and the tenant 100d.

In an embodiment, the root service provider 100 can have plurality sub-providers who are resellers and use the same instance of the platform to deliver the application to their own tenants with their own customization.

The method uniquely identifies each participant in the hierarchical service model as root provider, sub-provider and tenant and provides mechanism to establish relation between them.

In an embodiment, the established relation between the participants is maintained in a data store (either relational or non relational).

For an example, a health care product vendor in the United States (US) (root service provider) can have plurality of customers (at second level in the hierarchical service model) such as India (sub-provider at second level), Germany (sub-provider at second level), Brazil (sub-provider at second level)) and a NGO (tenant at second level). The NGO uses the health application for its end users (patients) without reselling and is referred as tenant at second level. Each country can have plurality of tenants (at third level of hierarchical service model) such as hospitals to finally take the health care application to the end users such as patients. The hospitals interested in reselling the application further to clinics are identified as service providers at level three. Then the health care management company creates sub-list of customizable entities as well as define scope of each entity from the sub-list. Thus, based on the sub-list and scope definition of the entities the countries, NGO, hospitals, clinics are allowed to customize entities at their respective hierarchy levels.

Figure 2:
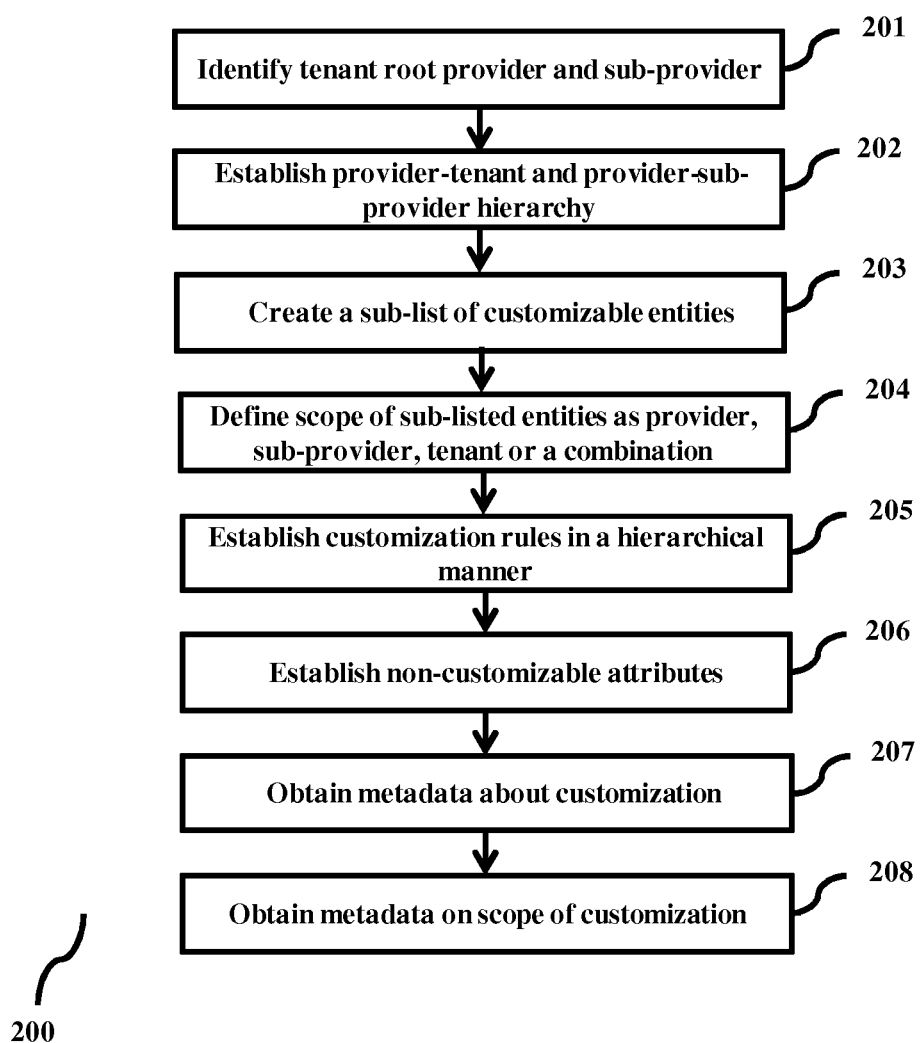
FIG. 2 illustrates a flow diagram explaining the process of configuration of the hierarchical service provider multi-tenant system, according to the embodiments disclosed herein.

FIG. 2 illustrates a flow diagram explaining the process of configuration of the hierarchical service provider model, according to the embodiments disclosed herein. As depicted in the flow diagram 200, the method uniquely identifies (201) all participants of the hierarchical service model as the root service provider, the sub-providers or the tenants.

In an embodiment, the method identifies participants using the user log in identification.

Further, the method establishes (202) relationship between these participants. For example, root service provider-tenant is the relation between tenant 100b and root service provider 100, whereas sub-provider 100a provider relates to root service provider 100 as a sub-provider. Typically, the relation is predefined at system level and the related data is maintained in the data store (either relational or non-relational). Thus, ancestors of all participants are identified and the relation between them is established. The method enables every provider (the root service provider and the sub-providers) to selectively declare the customizable entities by enabling them to create (203) a sub-list of customizable entities. These sub-lists of customizable entities created by respective providers (metadata of entities) are stored or maintained in the data store.

Further, the method defines (204) scope of the sub-listed entities as being specific to the root service provider, sub-providers, tenants or a combination of these participants. Thus, the scope definition of sub-listed entity enables mapping of the entity with respective participants allowed to customize the entity and defines which participant has the capability to customize from the sub-list of customizable entities.

Further, the method establishes (205) customization rules in a hierarchical manner. For example, every provider starting from the root provider 100, sub-provider 100a up to the lowest level sub-provider 101a can determine which entities can be customized by the providers and tenants downstream from the sub-list of entities available. Once the provider decides to revoke permissions for customization, the revoke cascades to all of the downstream participants be it providers or tenants. This metadata is again captured in a multi provider/multi-tenant manner. Every configuration done by the provider is visible to the hierarchy of providers on top but providers who are adjacent or downstream could not see the configuration. Every provider can customize the sub-list of entities by adding columns or hiding columns as per requirements.

Typically, the column can have specific data type along with validations (if any). In an embodiment, the column data types can be string, integer, long, decimal, date, time, pick list (Enumeration of Values). The providers can specify if a particular customization is applicable for all tenants, all sub-providers or specific tenants or specific providers down the hierarchy. Thereafter, the method enables establishing (206) non-customizable or mandatory attributes within the sub-listed customizable entities. The providers can specify the attributes that cannot be customized within the entities themselves and any effort to change to these non-customizable attributes is denied. Further, method obtains (207) metadata about customization including but not limited to fields, validation and screens. Thereafter, method obtains (208) metadata on scope of customization for root service provider (self) or all tenants or all sub-providers. All this metadata information is captured in a multi-provider or multi-tenant manner and stored in a data store. The various actions in flow diagram 200 may be performed in the order presented, in a different order or simultaneously. Further, in some embodiments, some actions listed in FIG. 2 may be omitted.

For example, a health care application provider (root service provider) having an entity 'patient' has one of the attribute as SSN. The SSN attribute is applicable to its customer in United States but not in India. The customer in India would wish to customize the entity 'patient' with attribute as 'telephone number' instead of SSN number. The customer in India can customize the entity 'patient' only if the root service provider has entered 'patient' in the sub-list of customizable entities with SSN not included in non-customizable attributes.

Figure 3:
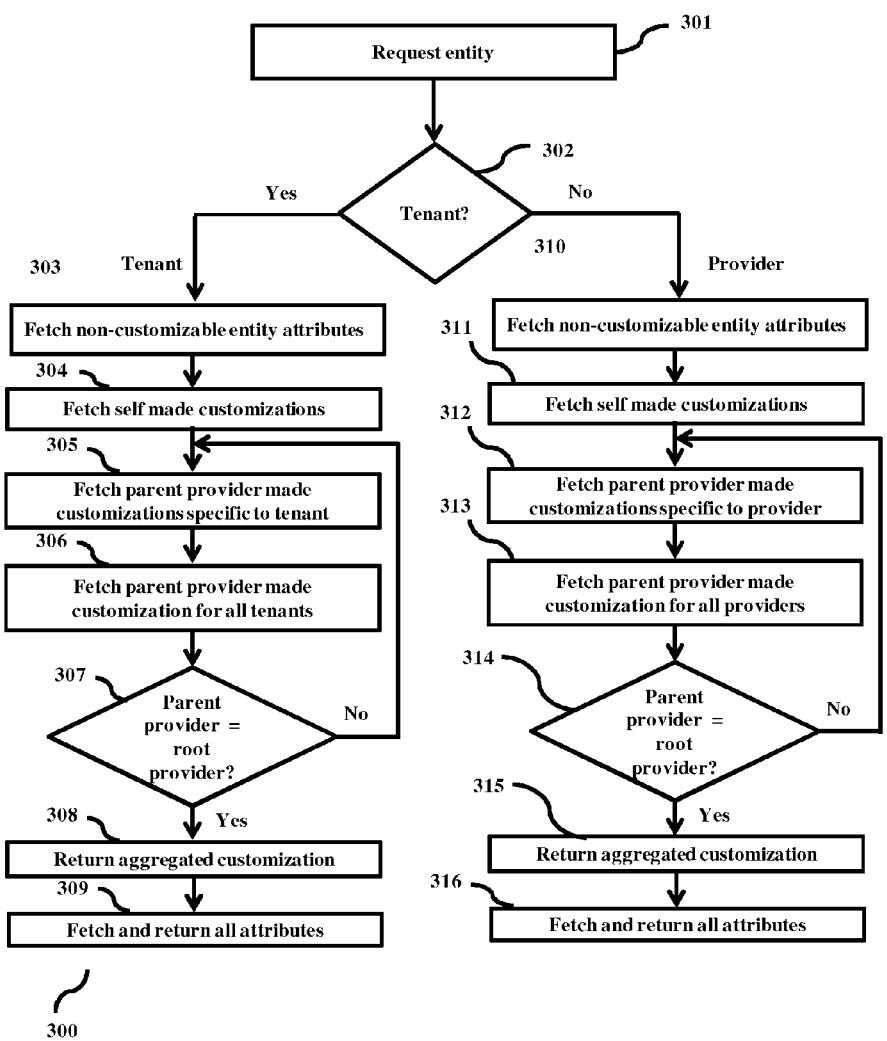
FIG. 3 illustrates a flow diagram explaining the runtime process in the hierarchical service provider, multi-tenant system, according to the embodiments disclosed herein.

FIG. 3 illustrates a flow diagram explaining the runtime process in the hierarchical service provider model, according to the embodiments disclosed herein. The flow diagram 300 depicts the way the configured customization is interpreted during run time. Once the configuration process for entity customization is completed, the customization data may be required by the system for processing the entity or may be required by the participant in the hierarchical service model. In an embodiment, the required entity customization data is made available on the User Interface (UI) of the participant.

During runtime, the participant logs in to retrieve desired information. The interested participant requests (301) for the desired entity. The method also enables the multi-tenant system to check for the participant making a request for entity. The method checks (302) for identity of requesting participant.

If the requesting participant is the tenant then the method fetches (303) all the non-customizable entity attributes, listed during configuration process by the provider. These non-customizable attributes are mandatory to the requesting tenant. Further, the method fetches (304) all the self made (requesting tenant) customizations. The customization includes addition or deletion of desired attributes. Thereafter the method fetches (305) parent provider made customizations specific to the requesting tenant. The parent provider refers to the provider in the immediate upper level of the hierarchical service provider model with respect to requesting tenant. Further, the method fetches (306) parent provider made customizations applicable to all the tenants of the parent provider. The method then checks (307) if the current parent provider is the root service provider itself. If the current parent provider is the sub provider, the method loops back to the step 305 to fetch customizations of parent provider in the next immediate upper level (ancestor) in the hierarchical service provider model. If the parent provider is identified as root service provider method returns (308) all the aggregated customizations specific to the requesting tenant. Thereafter, method fetches (309) and returns all attributes specific to the requesting tenant If the requesting participant is the provider then the method fetches (310) all the non customizable entity attributes, listed during configuration process by the provider. These non-customizable attributes are mandatory to the requesting provider. Further, the method fetches (311) all the self made (requesting provider) customizations. The customization includes addition or deletion of desired attributes. Thereafter the method fetches (312) parent provider made customizations specific to the requesting provider. The parent provider refers to the provider in the immediate upper level of the hierarchical service provider model with respect to requesting provider. Further, the method fetches (313) parent provider made customizations applicable to all the providers (sub providers) of the parent provider. The method then checks (314) if the current parent provider is the root service provider itself. If the current parent provider is the sub provider, the method loops to the step 312 to fetch customizations of parent provider in the next immediate upper level (ancestor) in the hierarchical service provider model. If the parent provider is identified as root service provider method returns (315) all the aggregated customizations specific to the requesting provider. Thereafter, method fetches (316) and returns all attributes specific to the requesting provider. The various actions in flow diagram 300 may be performed in the order presented, in a different order or simultaneously. Further, in some embodiments, some actions listed in FIG. 3 may be omitted.

Thus, the method enables tenants and sub-providers to inherit entity customization from all providers (in the higher hierarchy levels) in their respective chain.

For example, a television broadcast service provider (root service provider) provides software for delivering multiple channels to the subscribers (tenants) through plurality of sub-providers (Cable Service Operators). The software collects information about subscribers (Tenants) to various channels and also allows control of the channel delivery according to the subscription. Every month an invoice is generated according to the subscription. One of the sub-providers (cable service operators) can decide to add a field (attribute) to the invoice entity called "Cheque/Transaction Number" which will help the sub-provider map the payment made by the subscriber. This is localized to the sub-provider and is not visible for other sub-providers. This is possible only if the root service provider (broadcast service provider) allows the invoice entity to be customized by the sub-providers. If this entity has been marked as non-customizable then it is not possible for the sub-providers to customize this entity.

The method disclosed enables the root service provider to view and control all the entity level customization down the hierarchy using the data model (common platform) in the data store.

Figure 4:
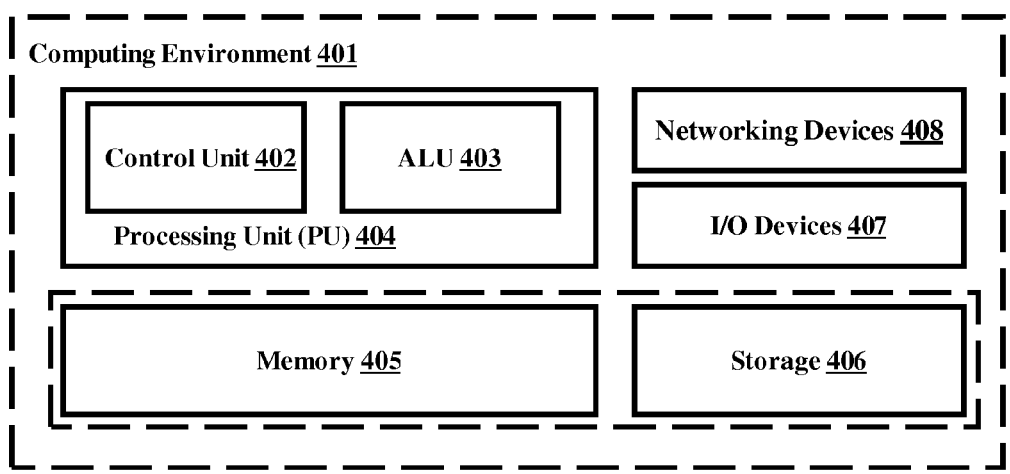
FIG. 4 illustrates the computing environment implementing the entity customization in a hierarchical service provider, multi-tenant system, according to the embodiments disclosed herein.

FIG. 4 illustrates the computing environment implementing the entity customization in a hierarchical service provider, multi-tenant system, according to the embodiments disclosed herein. As depicted the computing environment 401 comprises at least one processing unit 404 that is equipped with a control unit 402 and an Arithmetic Logic Unit (ALU) 403, a memory 405, a storage unit 406, plurality of networking devices 408 and a plurality Input output (I/O) devices 407. The processing unit 404 is responsible for processing the instructions of the algorithm. The processing unit 404 receives commands from the control unit in order to perform its processing. Further, any logical and arithmetic operations involved in the execution of the instructions are computed with the help of the ALU 403.

The overall computing environment 401 can be composed of multiple homogeneous and/or heterogeneous cores, multiple CPUs of different kinds, special media and other accelerators. The processing unit 404 is responsible for processing the instructions of the algorithm. Further, the plurality of processing units 704 may be located on a single chip or over multiple chips.

The algorithm comprising of instructions and codes required for the implementation are stored in either the memory unit 405 or the storage 406 or both. At the time of execution, the instructions may be fetched from the corresponding memory 405 and/or storage 406, and executed by the processing unit 404.

In case of any hardware implementations various networking devices 408 or external I/O devices 407 may be connected to the computing environment to support the implementation through the networking unit and the I/O device unit.

The embodiments disclosed herein can be implemented through at least one software program running on at least one hardware device and performing network management functions to control the network elements. The network elements shown in FIGS. 1 and 4 include blocks which can be at least one of a hardware device, or a combination of hardware device and software module.

The embodiment disclosed herein specifies a system for entity customization in the hierarchical service provider, multi-tenant system. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method of providing entity customization in a hierarchical service provider, multi-tenant system, said method comprising:
    running an instance of a software application on a computerized device, wherein the computerized device has a processing unit and a non-transitory memory;
    identifying, by the processing unit, participants in said hierarchical service provider, multi tenant system, wherein said participants are identified by using a user log in identification, and wherein the participants are identified as one of a root service provider, a sub provider, and a tenant;
    establishing, by the processing unit, a relationship amongst the participants;
    allowing, by the processing unit, said root service provider and said sub provider to create a sub-list of customizable entities;
    configuring, by the processing unit, a scope of each of the customizable entities by one of said root service provider and said sub provider, wherein the scope comprises:
        mapping each of the customizable entities with at least one participant capable of customizing a customizable entity, and wherein the at least one participant is one of said root service provider and said sub provider, and
        cascading permissions of customization for each participant, successor to the at least one participant, when the at least one participant revokes permissions for the customization of the customizable entity;
    establishing, by the processing unit, non customizable attributes in said sub-list of the customizable entities;
    aggregating, by the processing unit, customizations configured by each participant for a requesting participant until at least one of said root service provider, sub provider, and a tenant is determined as an ancestor to the requesting participant; and
    obtaining, by the processing unit, metadata of said at least one customizable entity from said sub-list from a data store.

2. The method as claimed in claim 1, wherein said aggregation is performed for at least one of:
    said entity customizations made by a requesting participant;
    said entity customizations made by a parent provider specific to said requesting participant;
    said entity customizations made by said parent provider to said participants; and
    said entity customizations made by an ancestor specific to at least one of said requesting participant, said participant, and said metadata.

3. The method as claimed in claim 1, wherein said method further comprises of retrieving said non-customizable attributes based on said metadata.

4. A system for providing entity customization in a hierarchical service provider, multi tenant system, said system comprises participants, a data store, a control unit, wherein the system comprises:
    a processing unit;
    a memory coupled to the processing unit, wherein the processing unit is capable for executing programmed instructions stored in the memory to:
    run an instance of a software application;
    identify participants in said hierarchical service provider, multi tenant system, wherein said participants are identified by using a user log in identification, and wherein the participants are identified as one of a root service provider, a sub provider, and a tenant;
    establish a relationship amongst the participants;
    allow said root service provider and said sub provider to create a sub-list of customizable entities;
    configure scope of each of the customizable entities by one of said root service provider and said sub provider, wherein the scope comprises:
        mapping each of the customizable entities with at least one participant capable of customizing a customizable entity, and wherein the at least one participant is one of said root service provider and said sub provider, and
        cascading permissions of customization for each participant, successor to the at least one participant, when the at least one participant revokes permissions for the customization of the customizable entity;
    establish non customizable attributes in said sub-list of the customizable entities;
    aggregate customizations configured by each participant for a requesting participant until at least one of said root service provider, sub provider, and tenant is determined as an ancestor to the requesting participant; and
    obtain metadata of said at least one customizable entity from said sub-list from a data store.

5. The system as claimed in claim 4, wherein said system is configured to retrieve said non-customizable attributes based on said metadata.

6. The system as claimed in claim 4, wherein said aggregation is performed for at least one of:
    said entity customizations made by a requesting participant;
    said entity customizations made by a parent provider specific to said requesting participant;
    said entity customizations made by said parent provider to said participants; and
    said entity customizations made by an ancestor specific to at least one of said requesting participant, said participant, and said metadata.

7. A non-transitory computer-readable medium encoded with a computer program product for providing entity customization in a hierarchical service provider, multi tenant system, said product comprising:
    an integrated circuit further comprising at least one processor;
    at least one memory having a computer program code within said circuit wherein said at least one memory and said computer program code with said at least one processor cause said product to:
    run an instance of a software application;

identify participants in said hierarchical service provider, multi tenant system, wherein said participants are identified by using a user log in identification, and wherein the participants are identified as one of a root service provider, a sub provider, and a tenant;

establish a relationship amongst participants;

allow said root service provider and said sub provider to create a sub-list of customizable entities;

configure scope of each of the customizable entities by one of said root service provider and said sub provider, wherein the scope comprises:

mapping each of the said-customizable entities at least one participant capable of customizing a customizable entity, and wherein the at least one participant is one of said root service provider and said sub provider, and cascading permissions of customization for each participant, successor to the at least one participant, when the at least one participant revokes permissions for the customization of the customizable entity;

establish non customizable attributes in sub-list of the customizable entities;

aggregate customizations configured by each participant for a requesting participant until at least one of said root service provider, sub provider, and tenant is determined as an ancestor to the requesting participant; and obtain metadata of said at least one customizable entity from said sub-list from a data store.

8. The computer program product as claimed in claim 7, wherein said computer program product further comprises of retrieving said non-customizable attributes based on said metadata.

9. The computer program product as claimed in claim 7, wherein said aggregation is performed for at least one of:

said entity customizations made by a requesting participant;

said entity customizations made by a parent provider specific to said requesting participant;

said entity customizations made by said parent provider to said participants; and said entity customizations made by an ancestor specific to at least one of said requesting participant, said participant, and said metadata.

* * * * *